United States Patent
Kroener et al.

(10) Patent No.: US 8,565,102 B2
(45) Date of Patent: Oct. 22, 2013

(54) METHOD FOR ADJUSTING THE TRANSMISSION OUTPUTS OF TWO CHANNELS OF A LINK STATION AND COMMUNICATION SYSTEM

(75) Inventors: Hans Kroener, Geislingen-Weiler (DE); Stefan Oestreich, Holzkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 1677 days.

(21) Appl. No.: 10/545,668

(22) PCT Filed: Dec. 9, 2003

(86) PCT No.: PCT/DE03/04053
§ 371 (c)(1),
(2), (4) Date: Aug. 15, 2005

(87) PCT Pub. No.: WO2004/073202
PCT Pub. Date: Aug. 26, 2004

(65) Prior Publication Data
US 2006/0140214 A1 Jun. 29, 2006

(30) Foreign Application Priority Data

Feb. 13, 2003 (DE) .................................. 103 06 171

(51) Int. Cl.
*H04J 1/16* (2006.01)
*H04J 3/16* (2006.01)

(52) U.S. Cl.
USPC ............................ 370/252; 370/328; 370/465

(58) Field of Classification Search
USPC ......................................... 370/252, 328, 465
See application file for complete search history.

(56) References Cited

U.S. PATENT DOCUMENTS

| | | | | |
|---|---|---|---|---|
| 6,148,208 | A * | 11/2000 | Love | 455/442 |
| 6,271,945 | B1 | 8/2001 | Terahara | |
| 6,360,088 | B1 | 3/2002 | Geist et al. | |
| 6,414,988 | B1 * | 7/2002 | Ling | 375/150 |
| 6,542,484 | B1 * | 4/2003 | Ovesjo et al. | 370/335 |
| 6,704,328 | B1 * | 3/2004 | Khaleghi et al. | 370/468 |
| 2002/0075827 | A1 * | 6/2002 | Balogh et al. | 370/331 |
| 2002/0111191 | A1 * | 8/2002 | Takatori et al. | 455/562 |
| 2002/0147025 | A1 * | 10/2002 | Savas | 455/522 |
| 2002/0151290 | A1 * | 10/2002 | Chen | 455/266 |
| 2002/0155854 | A1 * | 10/2002 | Vanghi | 455/522 |
| 2002/0172184 | A1 * | 11/2002 | Kim et al. | 370/344 |
| 2004/0137860 | A1 * | 7/2004 | Oh et al. | 455/127.1 |
| 2004/0190600 | A1 * | 9/2004 | Odenwalder | 375/147 |
| 2005/0003848 | A1 * | 1/2005 | Chen et al. | 455/522 |
| 2005/0130690 | A1 * | 6/2005 | Shinozaki | 455/522 |
| 2005/0147063 | A1 * | 7/2005 | Pi et al. | 370/335 |
| 2005/0246610 | A1 * | 11/2005 | Moulsley | 714/752 |
| 2006/0040624 | A1 * | 2/2006 | Lipka | 455/114.3 |
| 2007/0064640 | A1 * | 3/2007 | Grilli et al. | 370/320 |

FOREIGN PATENT DOCUMENTS

| | | | |
|---|---|---|---|
| EP | 0 917 321 | A1 | 5/1999 |
| EP | 1 011 211 | A1 | 6/2000 |
| EP | 1 257 092 | A1 | 11/2002 |
| EP | 1 274 178 | A1 | 1/2003 |

* cited by examiner

*Primary Examiner* — Andrew Lee
(74) *Attorney, Agent, or Firm* — Staas & Halsey LLP

(57) ABSTRACT

The transmission output of two channels of a first link is adjusted so that data from the first link is simultaneously transmitted by two channels. The transmission outputs of the two channels are adjusted to a common value which is dependent upon the value of a quality parameter of the data transmission of the first channel and the value of a quality parameter of the data transmission of the second channel.

15 Claims, 3 Drawing Sheets

METHOD FOR ADJUSTING THE TRANSMISSION OUTPUTS OF TWO CHANNELS OF A LINK STATION AND COMMUNICATION SYSTEM

CROSS REFERENCE TO RELATED APPLICATIONS

This application is based on and hereby claims priority to German Application No. 10306171.1 filed on Feb. 13, 2003, the contents of which are hereby incorporated by reference.

BACKGROUND OF THE INVENTION

1. Field of the Invention

The invention relates to a method for adjusting the transmission outputs of two channels of a link, a corresponding station for a communication system and also a communication system having a station of such a type.

2. Description of the Related Art

Data of a link can be transmitted in a great variety of ways between a transmitter and a receiver. The data transmission can take place for example over fixed lines or also by radio. With regard to radio transmission, the data transmission takes place over an air interface using high-frequency carrier waves. Examples of radio transmission systems are the now widespread mobile radio systems, such as for example the GSM system (Global System of Mobile Communication), predominant in Europe amongst other places, or the IS-95 system widely used particularly in the USA.

In order to increase the data rate of a link it can be desirable to assign more than just one channel for the data transmission to the link. With regard to the channels, depending on the multiplexing method used it can be a case of either a time slot of a time frame, a spreading code or a particular frequency or also a combination of the latter. The future UMTS-FDD (Universal Mobile Telecommunication Standard—Frequency Division Duplex) standard, intended primarily for Europe, for the third generation mobile radio systems provides for the assignment of a plurality of channels to a link, for example. In this context the question poses itself as to the manner in which the transmission output for two channels of the same link for example is to be adjusted.

SUMMARY OF THE INVENTION

An object of the invention is to set down a method for adjusting the transmission outputs of two channels of a first link in a communication system.

A method according to the invention provides that data from a first link is simultaneously transmitted over at least two channels. The transmission outputs of the two channels are adjusted to a common value which is dependent upon the value of a quality parameter of the data transmission of the first channel and upon the value of a quality parameter of the data transmission of the second channel.

The invention makes it possible to choose a common mechanism for the two channels for adjusting the transmission output since a common transmission output is adjusted for the two channels. Nevertheless, individual properties of the two channels are taken into consideration by using the values of the quality parameters of the two channels when determining the common transmission output.

The invention is particularly advantageous when different transmission conditions apply to the two channels, in other words when the values of their quality parameters of the data transmission are different. If in such a case the common transmission output were to be made dependent on only one quality parameter of the data transmission of one of the two channels, although this common transmission output would be suitable for the channel in question it would however be either too high or too low for the other channel. As a result of the invention, it is possible to adjust a common transmission output which lies between the needs of the two channels such that it is too high for the channel having the better transmission conditions and too low for the channel having the poorer transmission conditions. This means that although the transmission output may be higher than in the previously mentioned case where the quality parameter was taken into consideration for only one channel, nevertheless with regard to the invention the shortfall of transmission output falls below that required for the other channel in the optimum case is however comparatively less than in the previously mentioned case.

Different transmission conditions for the two channels can result from the fact that interference effects of different intensities occur for the two channels. "Interference effect" is understood to be the influence at the recipient's location of disruptive signals on the signals being transmitted.

For systems which utilize channels that are formed by using a combination of scrambling codes and orthogonal spreading codes, the following situation exists: with regard to intracell interference which is caused by transmissions over other channels within the same radio cell, the channels do not interfere at all with the same scrambling code as a result of the orthogonality of the spreading codes used. In practice however it is the case that the orthogonality is impaired by the multipath propagation. A so-called orthogonality factor of between 0.06 and 0.4 therefore results. The orthogonality factor indicates how an external channel adversely affects an observed channel in terms of interference. Channels which use different scrambling codes have an orthogonality factor with a value of 1, which means that the receive power caused by them at the receiver is to be considered interference in its full intensity.

The invention is particularly suitable for use for links within a third generation mobile radio system of the UMTS-FDD type. However, their use is not restricted to this situation and is also suitable for use in any other mobile radio systems and even other radio systems outside of mobile radio communication, as well as for communication systems in which the data is sent over the link not by radio but by using other means, fixed lines for example. The only prerequisite for using the invention is that two channels for simultaneous data transmission should be assigned to the first link. Instead of transmission using radio, transmission by other wireless transmission methods is also possible.

The invention can be used for any transmission directions of a link. In particular, it can be used in mobile radio systems both for the downlink direction and also for the uplink direction.

According to a development of the invention, the value of the quality parameter of the data transmission is determined for each of the two channels, a resulting value being calculated from the determined value of the quality parameter of the first channel and the determined value of the quality parameter of the second channel, the resulting value being compared with a target value and the transmission outputs of the two channels being adjusted as a function of the comparison of target and actual values.

As a result, it is possible to provide simply one control circuit (compared with providing separate control circuits for each of the two channels) for adjusting the two transmission outputs. It is therefore possible to implement the method with a relatively low resource requirement. In particular, the feedback of measurement values and/or control commands from the receiver to the sender, needed in such a control circuit, can be reduced, since in the case of just one control circuit this only needs to take place for the corresponding channel and not for both channels.

The quality parameter of the data transmission of the first channel and of the second channel can advantageously be a signal to noise ratio of the corresponding channel at the receiver. However, a bit error rate or a frame error rate can also be considered, for example.

According to a development of the invention, the data of the first link is interleaved between the two channels prior to transmission in such a manner that data of the first link which are consecutive before interleaving are assigned to different channels after interleaving. This means that the data is multiplexed onto the two channels, whereby in addition the sequence of the data transmission can however also be changed. The interleaving causes the aforementioned choice of a common transmission output for the two channels, which is too high for the "better" channel and too low for the "poorer" channel, to only have a marginal effect on the overall quality of the transmission. According to this development, consecutive data items are then namely transmitted alternatingly with a relatively high quality level and relatively low quality level, such that the mean transmission quality across the two channels is sufficiently good.

In order to increase the channels available in a radio cell for data transmission, provision can be made to scramble data prior to its transmission over the first channel by using a first scrambling code and to scramble data prior to its transmission over the second channel by using a second scrambling code. A scrambling code is a preferably relatively long sequence of bits with which the data bits provided for transmission are multiplied (scrambled) bit by bit. By preference, random sequences (PN, Pseudo Noise sequences) are used as scrambling codes in this situation. Such types of scrambling codes are employed for example in the downlink (that is the transmission direction from the base station to the subscriber station) in the case of UMTS-FDD.

In addition to the first link, further links each having at least one channel can be operated simultaneously and their corresponding data scrambled prior to transmission using a scrambling code in each case, the data of the first link to be transmitted and of the further links is spread using spreading codes prior to being scrambled, in which channels which use the same scrambling code use different spreading codes, and more channels of the further links are operated using the first scrambling code than using the second scrambling code. With regard to this constellation, the transmission conditions are better for the first channel than for the second channel.

The choice of orthogonal spreading codes means that it is namely possible when using just one single scrambling code to largely preserve the orthogonality of the spreading codes and by this means to achieve an optimum separation of the channels. However, if the spreading codes are used together with different scrambling codes, more severe interference between channels will result despite the orthogonality of the spreading codes which however use different spreading codes, and nevertheless also use different scrambling codes. Despite the use of orthogonal spreading codes, the channels with the first scrambling code therefore have a considerably more disruptive effect on the channels with the other scrambling code than the mutual interference affecting the channels with the same scrambling code. This results in more severe interference effects occurring for those channels which are assigned to the scrambling code that is used by the relatively low number of channels than for the channels with the particular scrambling code that is used by a relatively greater number of channels.

This development of the invention can be applied to all CDMA transmission systems in which a spreading of the frequency band used for the transmission is carried out by spreading codes with subsequent scrambling.

If the signal to noise ratio is used as a quality parameter, in a further embodiment of this development of the invention this can be calculated approximately for the second channel at a receiver of the data of the link as the ratio from the receive power on the first channel and the overall receive power. The receive power on the second channel is namely matched to the receive power on the first channel as a result of the common transmission output. Furthermore, the overall receive power approximately represents the interference for the second channel since only relatively few channels are operated with the second scrambling code, more channels however with the first scrambling code, for which an orthogonality factor of 1 applies in respect of the second channel.

The station according to the invention for a communication system and also the communication system according to the invention comprise the necessary means and facilities needed in order to implement the method according to the invention.

BRIEF DESCRIPTION OF THE DRAWINGS

These and other objects and advantages of the present invention will become more apparent and more readily appreciated from the following description of the exemplary embodiments, taken in conjunction with the accompanying drawings of which.

DETAILED DESCRIPTION OF THE PREFERRED EMBODIMENT

Figure 1:
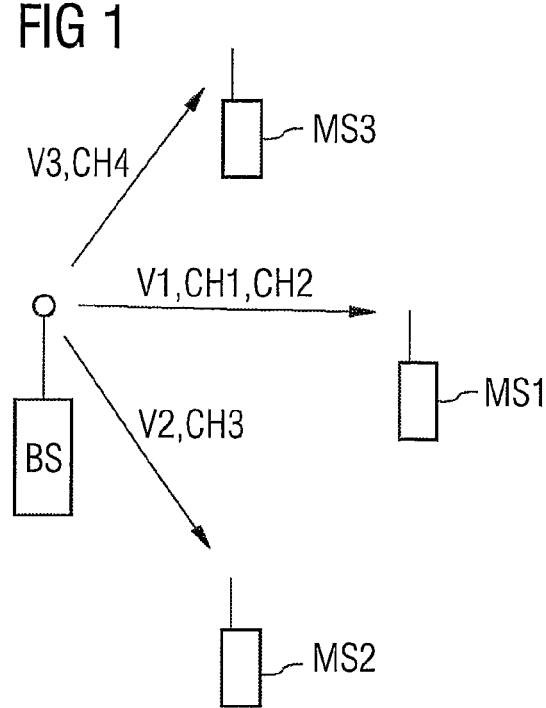
FIG. 1 is a block diagram showing a plurality of links within a mobile radio system.

Reference will now be made in detail to the preferred embodiments of the present invention, examples of which are illustrated in the accompanying drawings, wherein like reference numerals refer to like elements throughout.

The invention is described in the following with reference to a third generation mobile radio system in accordance with the UMTS-FDD standard.

It can however also be applied to other communication systems in which more than just one channel can be assigned to a link. In particular, it can therefore be applied to any desired mobile radio systems as well as to systems using any desired multiplexing methods. In the context of the invention the channels can therefore optionally feature different time slots of a time frame (TDMA), different frequencies (FDMA) or different spreading codes (CDMA) or also combinations of these three channel properties. In the following exemplary embodiment the channels are formed by a combination of a spreading code and a scrambling code.

FIG. 1 shows the section of an individual radio cell of a mobile radio system according to the UMTS-FDD standard. This illustrates a base station BS supplying the radio cell as well as three mobile stations MS1, MS2, MS3. The mobility of the stations is of minor importance to the invention. In other embodiments of the invention they can therefore also be stationary subscriber stations. The base station BS maintains a link V1, V2, V3 to each of the mobile stations MS1, MS2, MS3 respectively. In the following, only the transmission of data in the downlink direction (from the base station to the subscriber stations) is considered although the invention can also be applied in other embodiments to the opposite transmission direction (uplink). Two channels CH1, CH2 for the simultaneous transmission of data are assigned to the first link V1, whereas only one channel CH3, CH4 is assigned in each case to the second link V2 and to the third link V3 respectively.

Figure 2:
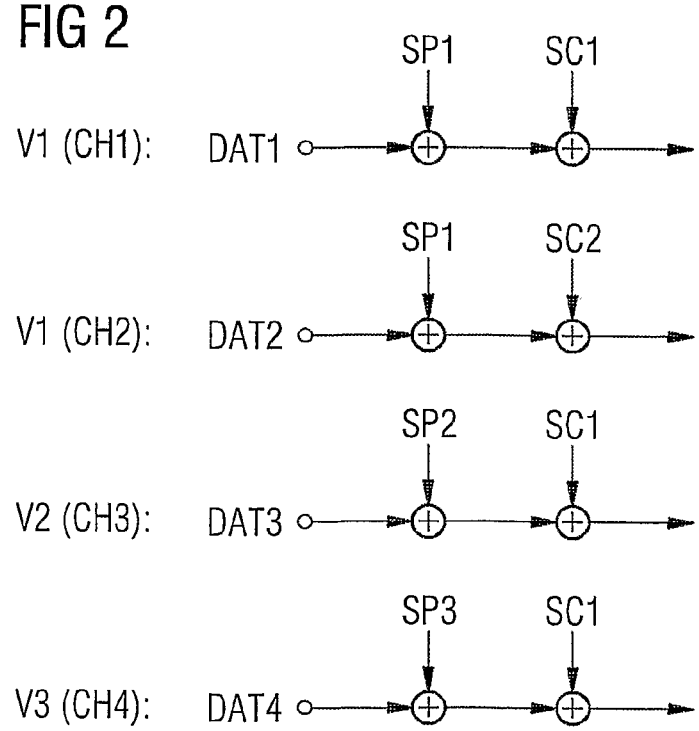
FIG. 2 is a channel processing diagram showing the send-side processing of data for different links.

FIG. 2 shows the send-side processing for the different links V1, V2, V3 from FIG. 1. The data DAT1, which is to be transmitted by way of the first channel CH1 of the first link V1, is initially spread by using a first spreading code SP1 and then scrambled by using a first scrambling code SC1. The data DAT2 of the second channel CH2 of the first link V1 is likewise spread by using a first spreading code SP1, but then scrambled by using a second scrambling code SC2. The data DAT3 of the channel CH3 of the second link V2 is spread by using a second spreading code SP2 and scrambled by using the first scrambling code SC1. The data DAT4 of the channel CH4 of the third link V3 is spread by using a third spreading code SP3 and scrambled by using the first scrambling code SC1. Accordingly, channels CH1, CH3, CH4 with the same scrambling code SC1 use different spreading codes SP1, SP2, SP3. On the other hand channels CH1, CH2, which use different scrambling codes SC1, SC2, can have the same spreading code SP1.

In the present exemplary embodiment more channels, namely the channels CH1, CH3 and CH4, use the first scrambling code SC1 than use the second scrambling code SC2, which is used only by the second channel CH2 of the first link V1. The channels CH1, CH3 and CH4 therefore cause greater disruption in total to the second channel CH2 through interference than the disruption caused by the second channel CH2 to the channels CH1, CH3 and CH4. The spreading codes SP1, SP2, SP3 used are namely orthogonal with respect to one another in this embodiment. The effect of this orthogonality is however only optimal in the context of channel separation as long as the same scrambling code is used. If different scrambling codes are used, greater disruption however occurs between the channels with the first scrambling code and the channels with the second scrambling code.

The interference effects with regard to the exemplary embodiment considered here differ particularly markedly for the first channel CH1 and the second channel CH2 of the first link V1 the more channels CH1, CH3, CH4 use the first scrambling code and the fewer channels CH2 use the second scrambling code SC2.

By a conscious choice of the channels used in total in the radio cell for links it is possible to exert influence in achieving the situation whereby as many of the channels as possible use the first scrambling code SC1 and as few as possible use the second scrambling code SC2. In particular, the code known in UMTS-FDD as Primary Scrambling Code comes into consideration as the first scrambling code SC1 and Secondary Scrambling Code as the second scrambling code SC2.

Figure 3:
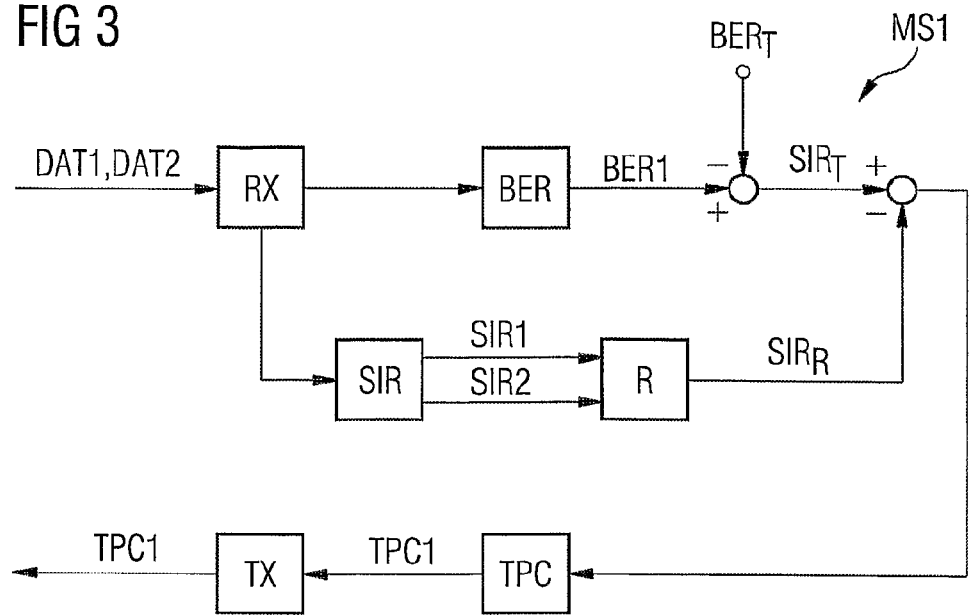
FIG. 3 is a block diagram of a mobile station in FIG. 1.

FIG. 3 shows the structure of the first mobile station MS1 from FIG. 1. The function of the common control circuit for the quality of the data transmission of the first channel CH1 and of the second channel CH2 of the first link V1 is described with reference to FIG. 3. This control circuit is used for adjusting the transmission outputs of the base station BS for the two channels CH1, CH2 to a common value. A receive unit RX of the first mobile station MS1 receives the data DAT1, DAT2 of the channels CH1, CH2. A facility BER determines a bit error rate BER1 for the first channel CH1 and compares this with a target value BERT. As the result of this comparison of target and actual values a target value SIRT is determined for the signal to noise ratio at the first mobile station MS1.

A facility SIR determines the signal to noise ratio SIR1, SIR2 both for the first channel CH1 and also for the second channel CH2 from the receive signals.

Figure 6:
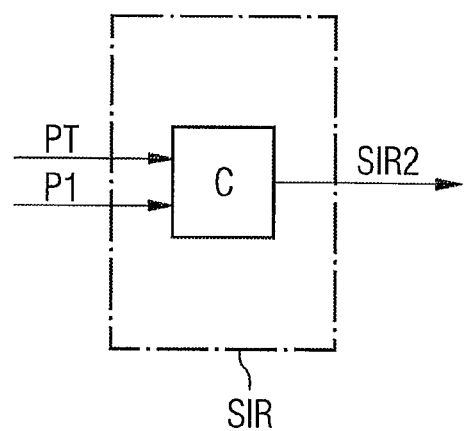
FIG. 6 is a block diagram of a unit for calculating a common signal to noise ratio in FIG. 3.

FIG. 6 shows that the facility SIR has a unit C which, in order to provide an approximate calculation of the signal to noise ratio SIR2 of the second channel CH2, divides the receive power P1 on the first channel CH1 by the overall receive power PT at the first mobile station MS1. Since transmission is performed on the two channels CH1, CH2 by the base station BS with the same transmission output P, the receive power (useful power) on the two channels at the mobile station MS1 is about the same. Moreover, the overall receive power PT at the mobile station MS1 is approximately identical to the interference effects for the second channel since only a few channels use the second scrambling code SC2 whereas the majority of channels use the first scrambling code SC1. An orthogonality factor of 1 applies to the latter in respect of the second channel CH2, and similarly to channels in adjacent radio cells.

In other embodiments of the invention, the signal to noise ratio SIR2 of the second channel CH2 and also the signal to noise ratio SIR1 of the first channel CH1 can be determined in the manner known to the person skilled in the art.

The two values determined for the signal to noise ratio SIR1, SIR2, which represent a measure of the quality of the data transmission, are fed to a facility R which calculates a resulting value SIRR from the two, for example by forming the arithmetic mean. This resulting value SIRR is then compared with the target value SIRT for the signal to noise ratio by a corresponding comparison unit.

A facility TPC generates control commands TPC1 corresponding to this comparison result for adjusting the transmission output of the first channel CH1 and the transmission output of the second channel CH2. These control commands TPC1 are transmitted by a send facility TX of the first mobile station MS1 to the base station BS.

Alternatively to FIG. 3, it is also possible in addition or as an alternative to determining the resulting signal to noise ratio SIRR to form a corresponding resulting value from other quality parameters of the data transmission. For example, it is also possible to form a resulting value of the bit error rates BER1, BER2 of the two channels CH1, CH2 and compare this with the target value BERT.

In an alternative embodiment, it is also possible for each of the two channels CH1, CH2 to initially perform a comparison of the respective quality parameter (the signal to noise ratio or the bit error rate, for example) and then for a comparison of this actual value of the quality parameter with a corresponding target value to be performed for each channel. In a further step, the comparison results for both channels can then (for example by determining the arithmetic mean) be combined to form a resulting value which is subsequently used for adjusting the transmission outputs of the two channels to a common value. In this case too the common transmission output of the two channels is dependent on the values of a quality parameter of the two channels.

Figure 4:
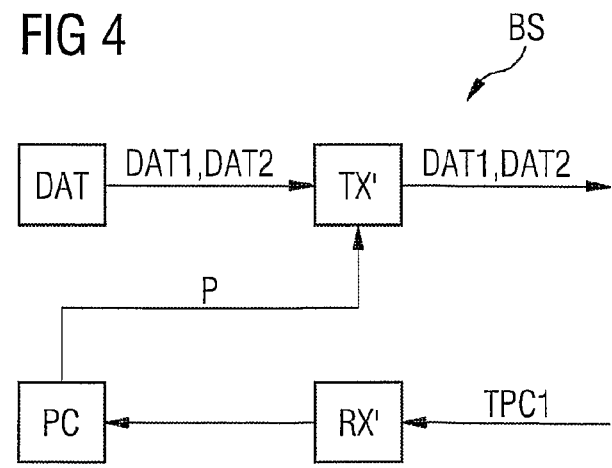
FIG. 4 is a block diagram of a base station in FIG. 1.

FIG. 4 shows the structure of a base station BS from FIG. 1. As also in the case of the mobile station MS1 in FIG. 3, only those components which are essential to the invention are illustrated in FIG. 4 for the base station BS. A facility DAT, which amongst other things performs the send-side preprocessing already described with reference to FIG. 2 and yet to be described further below with reference to FIG. 5, feeds the data DAT1, DAT2 provided for transmission on the two channels CH1, CH2 of the first link V1 of a send facility TX' which transmits this by way of the air interface to the mobile station MS1. In this situation, the data DAT1, DAT2 is sent out with a common transmission output P which is communicated by a unit PC for adjusting the transmission outputs of the two channels CH1, CH2 of the send unit TX'. A receive unit RX' receives the control commands TPC1 from the mobile station MS1 and forwards these to the output adjustment unit PC. The output adjustment unit PC changes the transmission output P of the first channel CH1 and of the second channel CH2 in accordance with the control commands TPC1. The control commands TPC1 signal to the base station BS that it should either increase or reduce the transmission output P.

Figure 5:
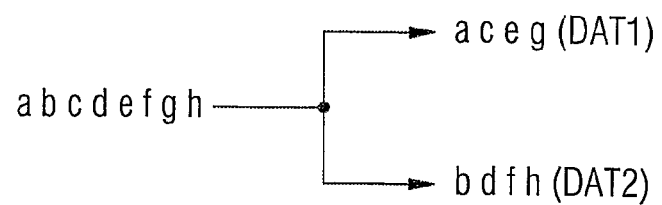
FIG. 5 is a data flow diagram showing the interleaving of data of a first link in FIG. 1 between the channels.

FIG. 5 shows further processing steps which are performed by the unit DAT in FIG. 4. It illustrates the principle of interleaving between the two channels CH1, CH2 of the data items a to h of the first link to be transmitted. The data is multiplexed onto the two channels such that the data DAT1 to be transmitted over the first channel CH1 is data items a, c, e, g and the data DAT2 to be transmitted over the second channel CH2 is data items b, d, f, h. In other exemplary embodiments the interleaving can also take place in a different manner, particularly by also changing the sequence of the data items on the two channels. The only important thing is that the interleaving causes consecutive data items of the link to be no longer transmitted in succession on the two channels but to be distributed amongst the channels.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method for adjusting the transmission outputs of first and second channels of a first link, comprising:
   simultaneously transmitting link data of the first link over the first and second channels; and
   adjusting transmission outputs, using a microprocessor, of the first and second channels to a common value dependent upon a value of a first quality parameter of transmitted data over the first channel and a value of a second quality parameter of transmitted data over the second channel.

2. A method according to claim 1, wherein the values of the first quality parameter and the second quality parameter are different for the first and second channels.

3. A method according to claim 2, further comprising:
   determining the values of the first and the second quality parameters;
   calculating a resulting value from the determined values of the first and the second quality parameters;
   comparing the resulting value with a target value; and
   adjusting the transmission outputs of the first and second channels depending on said comparing of the target and resulting values.

4. A method according to claim 3, wherein at least one of the first and the second quality parameters includes a signal-to-noise ratio.

5. A method according to claim 4, wherein the link data of the first link is interleaved between the first and second channels prior to transmission so that data items of the first link which are consecutive before interleaving takes place are assigned to different channels after interleaving.

6. A method according to claim 5, further comprising:
   scrambling the first data using a first scrambling code prior to transmission over the first channel; and
   scrambling the second data using a second scrambling code prior to transmission over the second channel.

7. A method according to claim 6,
   wherein in addition to the first link, additional links, each having at least one channel, are operated simultaneously, and
   wherein said method further comprises:
   scrambling corresponding data prior to transmission using a corresponding scrambling code for each channel of the additional links; and
   spreading, prior to all of said scrambling, the link data of the first link and of the additional links using spreading codes that are different for channels which use an identical scrambling code, and
   wherein more channels of the additional links are operated using the first scrambling code than the second scrambling code.

8. A method according to claim 7, wherein the signal-to-noise ratio of the second channel is calculated at a receiver of the link data approximately as a ratio of a receive power on the first channel to an overall receive power.

9. A method according to claim 8, wherein the link data of the first link is transmitted by way of a wireless interface.

10. A method according to claim 9, wherein the link data of the first link is transmitted from a base station of a mobile radio system to a subscriber station.

11. A station for a communication system, comprising:
    means for simultaneously transmitting data of a link over at least two channels; and
    means for adjusting transmission outputs of the at least two channels to a common value dependent upon a value of a first quality parameter of transmitted data over the first channel and a value of a second quality parameter of transmitted data over the second channel.

12. A communication system, comprising:
    means for simultaneously transmitting data of a link over at least two channels; and
    means for adjusting transmission outputs of the at least two channels to a common value dependent upon a value of a first quality parameter of transmitted data over the first channel and a value of a second quality parameter of transmitted data over the second channel.

13. A communication system according to claim 12, further comprising:
    means for determining the values of the at least one quality parameter of the data transmitted over each of the at least two channels;
    means for determining the values of the first and the second quality parameters;
    means for calculating a resulting value from the determined values of the first and the second quality parameters;
    means for comparing the resulting value with a target value; and
    means for adjusting the transmission outputs of the first and second channels depending on said comparing of the target and resulting values.

14. A method performed by a microprocessor for adjusting outputs, comprising:

simultaneously transmitting link data of the first link over the first and second channels; and adjusting outputs of a first channel and a second channel to a common value dependent upon a value of a first parameter of data output over the first channel and a value of a second parameter of data output over the second channel.

15. A method performed by a microprocessor for adjusting a signal, comprising:

adjusting a signal of a first channel and a second channel to a common value dependent upon a value of a first parameter of data on the first channel and a value of a second parameter of the same data on the second channel.

* * * * *